United States Patent [19]

Kamai et al.

[11] Patent Number: 4,653,453

[45] Date of Patent: Mar. 31, 1987

[54] ENGINE THROTTLE VALVE POSITION DETECTING SYSTEM

[75] Inventors: Kenichiro Kamai, Toyoake; Toshiaki Kikuchi, Okazaki, both of Japan

[73] Assignee: Nippondenso Co., Ltd., Kariya, Japan

[21] Appl. No.: 799,250

[22] Filed: Nov. 18, 1985

[30] Foreign Application Priority Data

Nov. 28, 1984 [JP] Japan ..................... 59-252747

[51] Int. Cl.[4] ..................... F02M 51/00; G01M 15/00

[52] U.S. Cl. ..................... 123/494; 123/478; 73/117.3

[58] Field of Search ..................... 123/325, 339, 478, 480, 123/486, 488, 491, 494; 73/115, 116, 117.3, 118, 118 A; 200/DIG. 17

[56] References Cited

U.S. PATENT DOCUMENTS

| | | | |
|---|---|---|---|
| 4,359,894 | 11/1982 | Ikeura et al. | 73/118 A |
| 4,491,115 | 1/1985 | Otobe et al. | 123/325 X |
| 4,510,902 | 4/1985 | Tsuchida et al. | 123/325 |
| 4,512,319 | 4/1985 | Williams et al. | 123/488 |
| 4,523,561 | 6/1985 | Kosuge | 123/339 |
| 4,561,295 | 12/1985 | Kamai | 73/117.3 |

FOREIGN PATENT DOCUMENTS 0013169 2/1978 Japan .

*Primary Examiner*—Willis R. Wolfe, Jr.
*Attorney, Agent, or Firm*—Cushman, Darby & Cushman

[57] ABSTRACT

An engine throttle valve position detector has a throttle switch formed by a rotary detector member rotatable with the engine throttle valve, a single stationary contact and a single movable contact movable by a guide groove in the rotary detector member into and out of electrical contact with the stationary contact. The stationary and movable contacts are contacted together when the throttle valve is in both fully-closed and fully-open positions, to thereby emit electric signals to an electric control unit in which the signals are processed on the basis of engine intake air flow and engine oil temperature to judge one of the throttle valve fully closed and fully-open positions.

8 Claims, 9 Drawing Figures

ENGINE THROTTLE VALVE POSITION DETECTING SYSTEM

CROSS-REFERENCE TO RELATED APPLICATION

The present application is related to KAMAI U.S. application Ser. No. 705,304 filed Feb. 25, 1985, now U.S. Pat. No. 4,561,295, the disclosure of which is incorporated herein by reference.

BACKGROUND OF THE INVENTION

1. Field of the Invention

The present invention relates to a throttle valve position detecting system adapted for detecting that a throttle valve provided in the intake pipe of an automotive engine has reached a predetermined position.

2. Description of the Prior Art

A typical conventional throttle valve position detecting system is disclosed in Japanese Pre-Examination Patent Publication No. 53-13169 and has a rotary detector (referred to as "rotor" hereinunder) adapted for rotation with a throttle shaft carrying the throttle valve. The rotor has a guide groove which extends substantially in the direction of rotation of the rotor. The guide groove has a stepped configuration constituting a cam contour such that a movable contact received in this guide groove is displaced radially outwardly and inwardly when the rotor rotates in one and the other directions. A pair of stationary contacts, namely, a first stationary contact for detecting that the throttle valve has reached the fully open position and a second stationary contact for detecting that the throttle valve has reached the fully closed position, are disposed in alignment with the movable contact in the radial direction of the rotor. The movable contact and the two stationary contacts are assembled together to form a unit which will be referred to as "throttle switch" hereinunder.

In operation, when the rotor rotates as a result of the throttle valve operation, the movable contact is moved in the radial direction by the cam action of the guide groove into contact with one of the stationary contacts thus detecting that the throttle valve has reached the fully opened position or the fully closed position.

This known throttle valve position detecting system, however, requires a large space for accommodating all of three contacts; namely, one movable contact and two stationary contacts. In addition, for connecting these three contacts of the throttle switch to an electronic control unit (referred to as "ECU" hereinunder), the connector on the throttle switch is required to have three terminals. In consequence, the cost and the size of the throttle switch are increased undesirably. Furthermore, three electric lines have to be used to connect the throttle switch to the ECU, resulting in complicated construction of the throttle valve position detecting system.

SUMMARY OF THE INVENTION

Accordingly, an object of the invention is to provide a less-expensive engine throttle valve position detecting system having a simple, compact and lightweight construction and providing a reliable operation.

The engine throttle valve position detecting system according to the present invention includes a throttle switch which includes a rotary detector member adapted to be rotated in accordance with the rotation of the engine throttle valve and having a guide portion including a section offset radially relative to the direction of rotation of the rotary detector member, a movable contact movable by the rotation of the rotary detector member and a stationary contact disposed in opposed relationship to the movable contact. The movable and stationary contacts have a first open position in which the two contacts are spaced apart and a second closed position in which the two contacts are closed to close an electrical circuit. The two positions of the two contacts are changed over when the rotary detector member has been rotated to either one of two different predetermined rotational positions. The system further includes means for producing a signal related to the operation of the engine, means for comparing a temperature representative of the engine operating conditions with a predetermined reference level, judgement means operative, when the engine operating condition temperature is judged in the comparing means as being higher than the predetermined level, to judge the position of the throttle valve based on one of the positions of the movable and stationary contacts and on the signal, and setting means operative, when the engine operating condition temperature is judged in the comparing means as being lower than the predetermined reference level, to set, irrespective of the signal, that the position of the throttle valve judged based on the one of the positions of the movable and stationary contacts is in fully closed position.

As will be seen from the above, the throttle switch is provided with a single stationary contact and a single movable contact. This is advantageous in that the construction of the throttle switch is simplified to facilitate easy production and reduce the cost of manufacture. Moreover, the setting means provided in addition to the judgement means are operative to set that, when the engine operating condition temperature is lower than the predetermined level, the position of the throttle valve is in fully closed position. This feature of the invention advantageously assures that the engine operation can be reliably controlled. The system of the invention may preferably further include means for prohibiting interruption of fuel supply to the engine when the engine operating condition temperature is judged to be lower than the predetermined reference level. The prohibiting means advantageously assures smooth and comfortable acceleration of an associated vehicle when the vehicle operator actuates an accelerator in an attempt to accelerate the vehicle.

The above and other objects, features and advantages of the invention will be made more apparent by the following description with reference to the accompanying drawings.

DESCRIPTION OF THE PREFERRED EMBODIMENT

Figure 1:
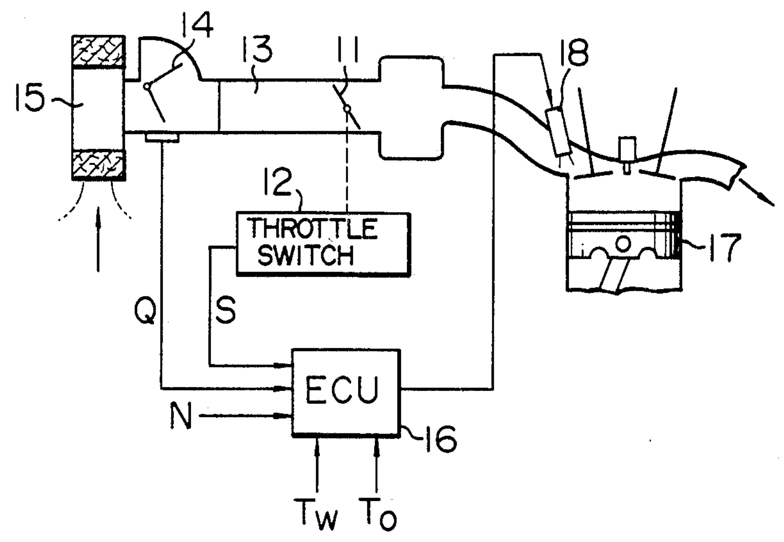
FIG. 1 is a schematic illustration of an internal combustion engine incorporating a throttle valve position detecting system of the invention.

Referring first to FIG. 1, an intake pipe 13 extending from an air cleaner 15 is connected to an internal combustion engine 17. The intake pipe 13 contains an air flow meter 14 for measuring the air flow rate, a throttle valve 11 disposed downstream of the air flow meter 14, and a fuel injector 18 disposed downstream of the throttle valve 11. A throttle switch 12 is operatively connected to the throttle valve 11 and electrically connected to an ECU 16 to emit a throttle position signal S to the ECU 16. The ECU 16 receives other various signals such as an intake air flow rate signal Q from the air flow meter 14, an engine speed signal N, an engine cooling water temperature signal Tw and an engine oil temperature signal To. Upon receipt of these signals, the ECU 16 controls the duration and timing of electric supply to the injector 18.

An explanation will be made hereinunder as to the throttle switch 12 with specific reference to FIG. 2.

The throttle switch 12 has a rotor 201 constituting a rotary detector member and made of a plastic material such as polyamide resin. The rotor 201 is operatively connected to the throttle valve 11 such that it rotates in accordance with the rotation of a throttle valve shaft. The rotor 201 is formed therein with a guide groove 202 constituting a guide means. The guide groove 202 has an elongated arcuate form extending substantially in the circumferential direction and having a portion which is offset radially inwardly. Thus, the guide groove 202 has two end portions and an intermediate portion which is offset radially inwardly from the end portions. The two end portions correspond to the throttle fully-open position and throttle fully-closed position, respectively. The rotor 201 is mounted on a base plate 205 for rotation as indicated by arrows and is formed in its central portion with a throttle shaft hole. The throttle shaft carrying the throttle valve 11 extends through this throttle shaft hole and fixedly connected with the rotor 201. A fixed member 206 made of a plastic material is secured to the base plate 205. The member 206 is provided at its lower side with two lugs 207 and 208 which are formed integrally therewith by molding. First and second contact carrier leaf springs 209 and 210 (referred to as "first and second leaf springs" hereinunder) are secured at their upper ends to lugs 208 and 207, respectively. The first leaf spring 209 carries at its free end a stationary contact 204 which is used for the detection of both of the throttle valve fully-closed position and fully-opened position. The second leaf spring 210 is provided on its free end with a movable contact 203 which is adapted to be moved in the radial direction along the guide groove 202 when the rotor 201 rotates. The movable contact 203 is a cylindrical member of a size greater than the width of the second leaf spring 210 and mounted thereon so that one end of the cylindrical movable contact 203 is received in and guided by the guide groove 202.

The operation of this throttle switch 12 is as follows: The rotation of the throttle valve 11 to its fully-closed position causes a clockwise rotation of the rotor 201 as viewed in FIG. 2, so that the movable contact 203 on the end of the second leaf spring 210 is guided by the guide groove 202 and moved radially outwardly, while resiliently deflecting the leaf spring 210 radially outwardly. When the throttle valve 11 reaches the fully-closed position, the movable contact 203 contacts the stationary contact 204 thus closing a circuit, as shown in FIG. 3A.

Figure 2:
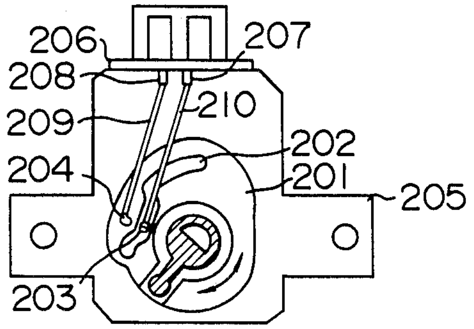
FIG. 2 is a front elevational view of a throttle switch incorporated in an embodiment of the throttle valve position detecting system in accordance with the invention.
Figure 3A:
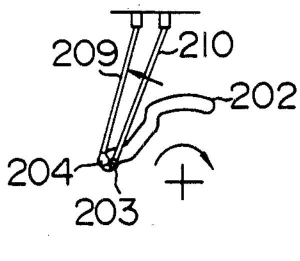
FIG. 3A is a schematic front elevational view of the throttle switch when it is in a position in which the throttle valve is fully closed.

Conversely, the rotation of the throttle valve 11 toward the open position causes a counter-clockwise rotation of the rotor 201 as viewed in FIG. 2. Consequently, the movable contact 203 is moved radially inwardly as it is guided by the guide groove 202. When the rotor 201 has rotated a predetermined angle, e.g., 2°, from the position corresponding to the throttle fully-closed position, the movable contact 203 is separated from the stationary contact 204.

Figure 3B:
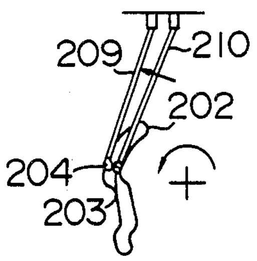
FIG. 3B is a schematic front elevational view of the throttle switch when in another position in which the throttle valve is fully opened.

When the throttle valve 11 reaches an open position which is angularly spaced 50° from the fully closed position, the rotor 201 reaches a position shown in FIG. 3B. During this rotation, the movable contact 203 is moved again radially outwardly along the guide groove 202 while deflecting the leaf spring 210. When the rotor reaches the position shown in FIG. 3B, the movable contact 203 again makes contact with the stationary contact 204 thus closing the circuit.

Figure 8:
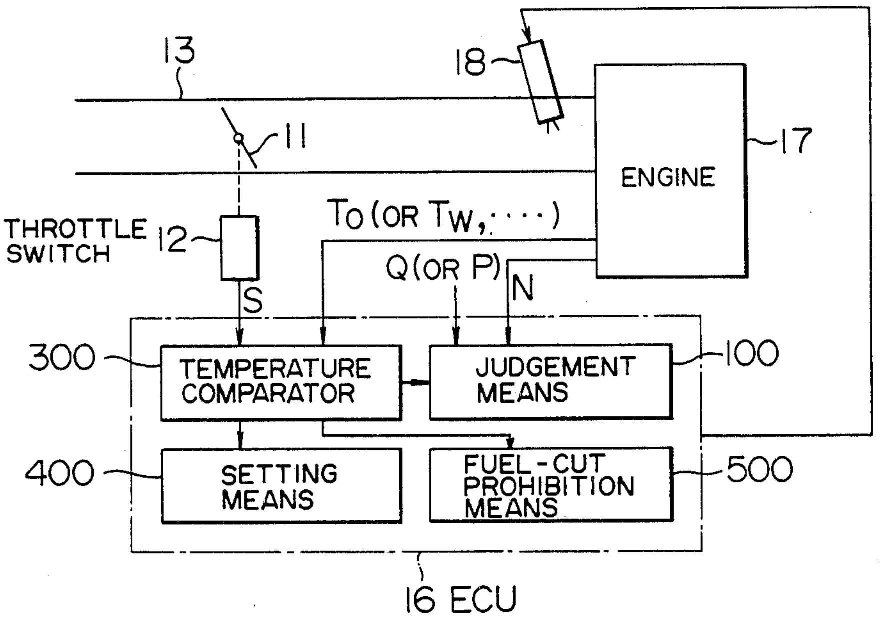
FIG. 8 is a block diagram showing general arrangement of various means included in an electrical control unit.

It will be understood that the movable contact 203 makes contact with the stationary contact when the throttle valve 11 is both in the fully-opened position and in the fully-closed position. Therefore, it is necessary to employ a means 100 (see FIG. 8) for judging whether the throttle valve is in the fully-closed position or in the fully-opened position when the circuit is closed by the mutual contact between the movable and stationary contacts 203 and 204. The judging means 100 will be described hereinunder.

Figure 4:
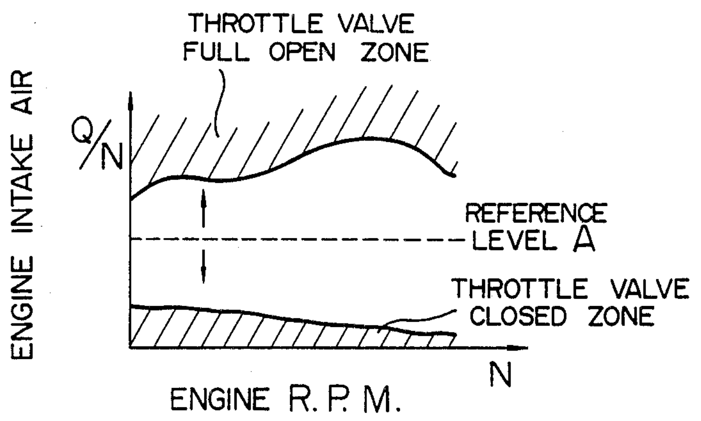
FIG. 4 is a graph showing variation of engine intake air flow per engine revolution relative to the engine speed when the throttle valve is fully closed and fully opened, respectively.

As stated before, the ECU 16 receives various signals such as the throttle valve position signal S, intake air flow rate signal Q, engine speed signal N, engine cooling water temperature signal Tw, engine oil temperature signal To and so forth. It has been well known in the art that, in the condition where such a temperature as is represented by the engine oil temperature is at a high level, the quantity of air sucked into the engine per revolution, i.e., the ratio Q/N, which is obtained when the throttle valve 11 is fully closed, is less than ⅓ of that obtained when the throttle valve is fully opened. In view of this fact, a reference level A of the ratio Q/N is suitably selected as shown in FIG. 4 and a judgement is made as to whether the measured ratio Q/N is below or above this reference level A. Namely, when the measured value Q/N is below the reference level A when the circuit is closed by the contacts 203 and 204, the throttle valve 11 is judged to be in the fully-closed position, whereas, when the reference level A is exceeded by the measured ratio Q/N, the throttle valve is judged to be in the fully-opened position.

Figure 5:
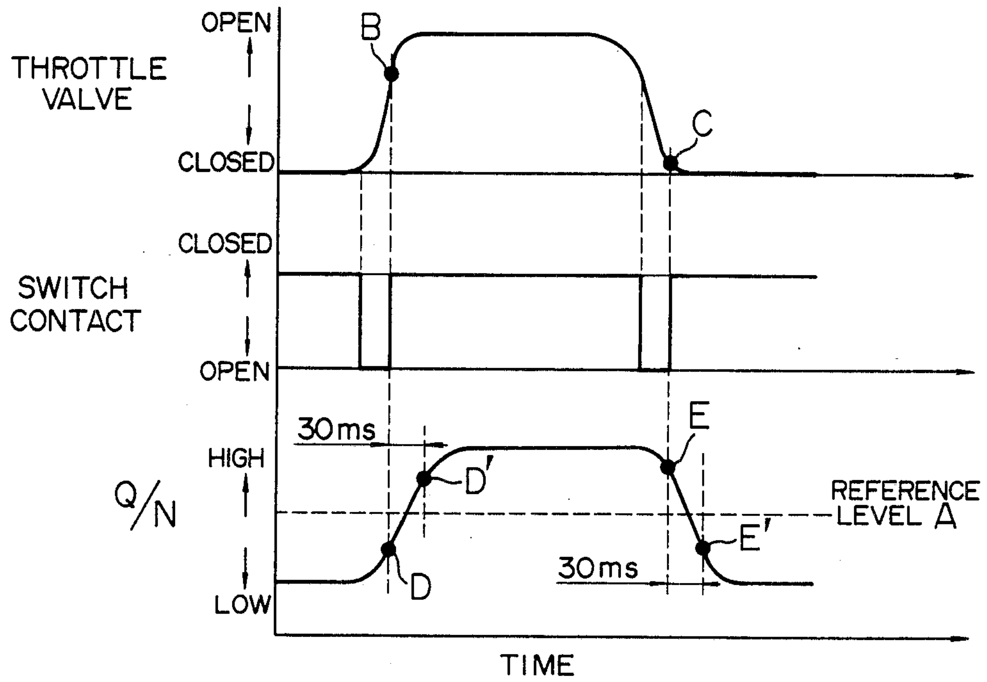
FIG. 5 is a time chart showing the change in the positions of the contacts of the throttle switch and the change in the engine intake air per revolution, both relative to the change in the throttle valve positions.

When the throttle valve 11 is quickly opened from the fully-closed position, the change in the ratio Q/N is delayed behind the change in the throttle valve position as shown in FIG. 5. Therefore, when the throttle valve has been opened to a position B shown in FIG. 5, the ratio Q/N represented by a level D is still below the reference level A, so that a wrong judgement would be made which leads to the production of a signal representing that the throttle valve is still in the fully-closed position. A similar wrong judgement would also be made when the throttle valve 11 is quickly closed from the fully-opened position. Namely, when the throttle valve has reached an almost fully-closed position indicated by C, a point E representing the ratio Q/N as measured is still higher than the reference level A, so that a wrong judgement would be made which allows generation of a signal representing that the throttle valve is still in the fully-opened position.

In order to obviate such wrong judgements, the reference level A is compared with ratio Q/N at point D' and E' measured after the lapse of a predetermined period of time, e.g., 30 ms, from the moment at which the circuit is closed by the mutual contact between the movable and stationary contacts 203 and 204. A judgement is thus conducted based on the comparison thus made.

Figure 7:
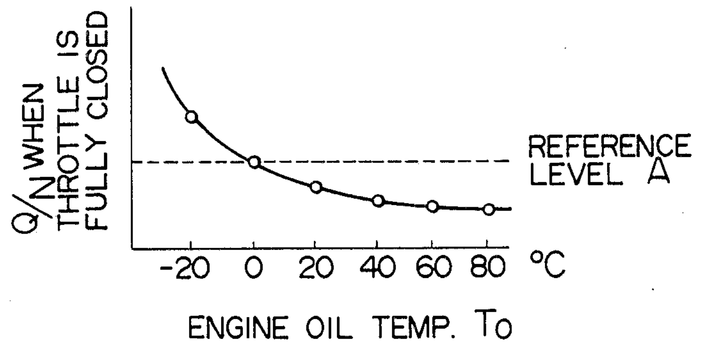
FIG. 7 is a graph showing variation of engine intake air flow per engine revolution when the throttle is fully closed relative to engine oil temperature.

When engine operation has just been started in a cold season such as winter, a large frictional loss is produced in the engine 17 by the operation of the pistons and the crankshaft. Thus, a large quantity of air is required to maintain the engine in operation. More specifically, the lower is the temperature which represents the engine operation condition, the greater is the ratio Q/N, so that the ratio Q/N obtained when the throttle valve is in fully closed position varies with the engine oil temperature To in the manner shown in FIG. 7. Accordingly, there is a possibility that the ratio Q/N exceeds the reference level A in FIG. 4 even when the throttle valve is fully closed. In such case, the ECU 16 would make a wrong judgement that the throttle valve is in fully open position notwithstanding the fact that the throttle valve is in fully closed position. If such a wrong judgement is made, the depression of the accelerator pedal by the operator who attempts to accelerate the vehicle will not result in the acceleration of the vehicle speed because the ECU 16 does not judge that the accelerator has been actuated from the fully closed throttle valve position and thus any accelerating increase in the mixture supply to the engine does not take place. Therefore, the operator's attempt to accelerate the vehicle speed will merely result in the occurrence of vehicle shock which greatly spoils the acceleration feeling of the vehicle.

In order to eliminate such a wrong judgement by the ECU 16, therefore, the system according to the present invention is provided with a temperature comparator 300 operative to compare the engine oil temperature To with a predetermined reference level (0° C., for example) set in the ECU 16. If the engine oil temperature To is lower than the reference level and when the movable and stationary contacts 203 and 204 of the throttle switch 12 are in contact with each other, a setting means 400 is operative, irrespective of the value of the ratio Q/N, to set that the throttle valve 11 is in fully closed position. At this time, a fuel-cut prohibition means 500 operates to prohibit interruption of fuel supply (i.e., so-called "fuel-cut") to the engine.

In the case where the engine oil temperature To is lower than the reference level and the throttle valve 11 is moved from the fully open position towards a closed position, the movable contact 203 is moved out of contact with the stationary contact 204. In this case, the ECU 16 judges the throttle valve 11 as being opened from the fully closed position and performs correction to cause an accelerating increase of fuel supply to the engine. At this time, however, the throttle valve 11 is opened sufficiently wide enough to cause a large amount of air to be supplied into the engine 17 and the air flow meter 14 detects this large amount of air supply to engine to emit a corresponding signal Q to the ECU 16 so that the latter instructs the fuel injector 18 to inject a correspondingly large quantity of fuel. Accordingly, the above-mentioned accelerating increase of fuel supply is at a so small rate compared with the rate of the fuel supply at this time that no shock is caused in the engine operation.

The purpose of the prohibition of the fuel-cut when the engine oil temperature To is less than the reference level is to eliminate the occurrence of a wrong operation that, notwithstanding the fact that the throttle valve 11 is in fully open position to increase the speed of the engine 17, the ECU 16 judges on the basis of the closed position of the movable contact 204 that the throttle valve 11 is closed and the engine operation is being decelerated and, consequently, the part of the ECU 16 which is related to the control of the fuel supply acts on the fuel injector 18 to interrupt or cut the injection of fuel into the engine.

Figure 6:
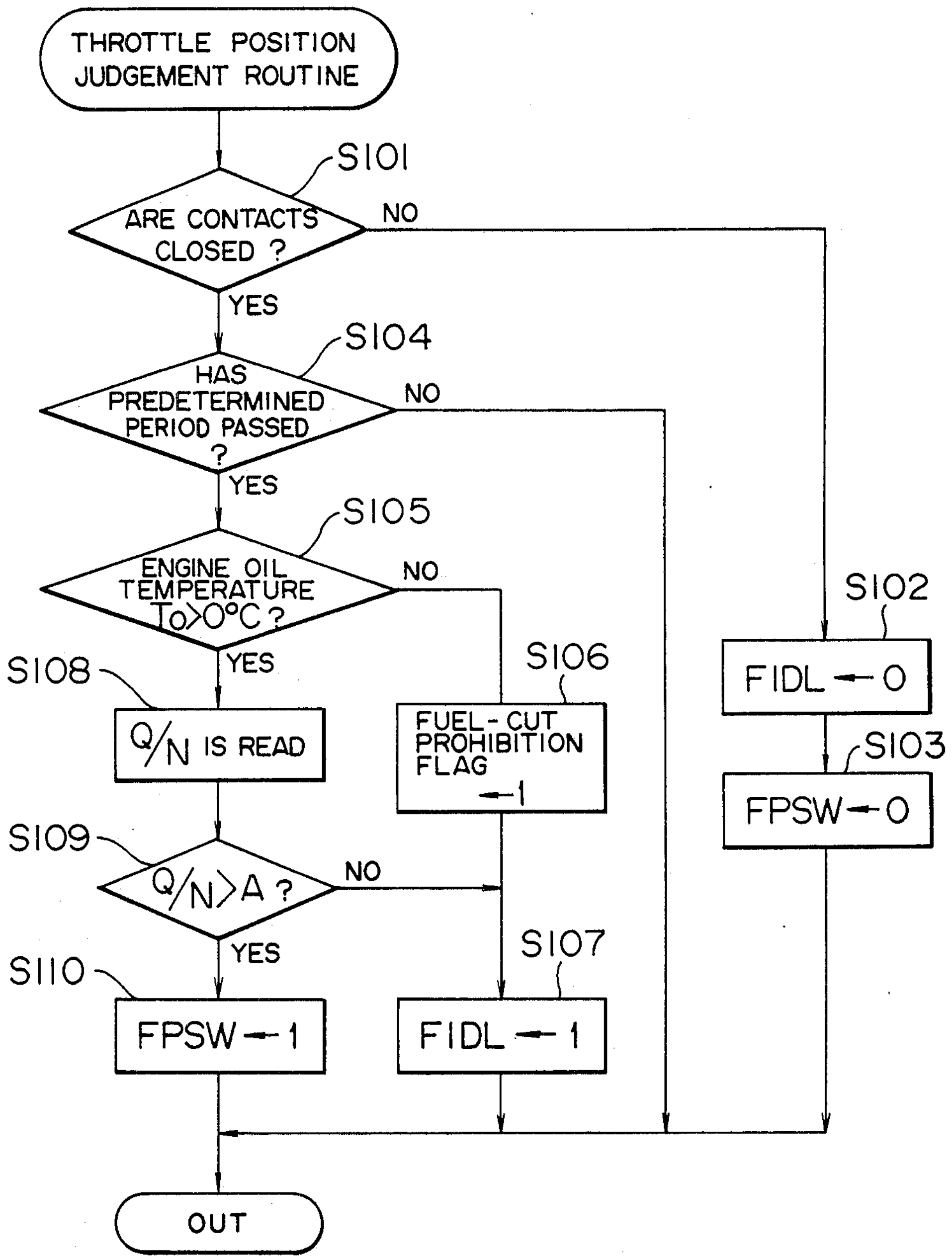
FIG. 6 is a flow chart showing the process in which a judgement conducted in an embodiment of the invention is performed by a microcomputer.

The operation described above may be conducted by a microcomputer incorporated in the ECU 16. The flow of the process performed by such a microcomputer is shown in FIG. 6 by way of example.

In a step S101, a judgement is made as to whether the movable and stationary contacts are in contact with each other, i.e., whether the electric circuit is closed or not. If the result of this judgement is "NO", i.e., if the circuit is not closed, it is judged that the throttle valve is neither in the fully-opened position nor in the fully-closed position, and the process proceeds to the next routine after setting down a full-close detection flag (FIDL) in a step S102 and setting down a full open detection flag (FPSW) in a step S103. When the answer obtained in the step S101 is "YES", i.e., when the closing of the electric circuit is judged, the lapse of the aforementioned predetermined time period is confirmed in a step 104. After the confirmation, the process proceeds to a step S105 in which the engine oil temperature To is compared with a predetermined reference level, for example, 0° C. If the engine oil temperature is judged to be lower than the predetermined level, the process proceeds to a step S106 in which a fuel-cut prohibition flag is set up. The process then proceeds to a step S107 in which a full-close detection flag (FIDL) is set up. In the step S105, if it is judged that the engine oil temperature To is higher than the predetermined temperature level, the process proceeds to a step S108 in which the ratio Q/N is read and the thus read ratio Q/N is compared with the predetermined reference level A in a step S109. When the read value of the ratio Q/N is smaller than the reference level A, the process proceeds to the step S107 in which the full close detection flag is set up. However, when the reference level A is exceeded by the ratio Q/N, the process proceeds to a step S110 in which the full open detection flag (FPSW) is set up. After the flag FIDL or FPSW is set up in step S107 or S110, the process then proceeds to a succeeding routine.

With this arrangement, it is thus possible to judge whether the throttle valve is in the fully-opened position or in the fully-closed position when the electric circuit is closed.

In the described embodiment of the invention, the engine oil temperature To is compared with a reference level A in the step S105 and the result of the comparison is utilized to decide the step to be followed. This is not exclusive and other various temperatures which will indicate the engine operation condition where a large frictional loss is caused by the operation of the engine 17 can be utilized. Examples of such temperatures are engine cooling water temperature Tw, cylinder block temperature, cylinder head temperature and the temperature of the intake manifold 13. Each of such temperatures exhibits a characteristic similar to that of the engine oil temperature To shown in FIG. 7. In the case where one of such temperatures is used, the selected temperature is compared in the step 105 with a reference level which is predetermined for the selected temperature.

Further alternatively, the pressure in the intake manifold of the engine can be detected in place of the ratio Q/N and compared with a reference level in the step S109 to judge whether the throttle valve is in the fully-opened position or in the fully-closed position.

What is claimed is:

1. An engine throttle valve position detecting system including:

a throttle switch including a rotary detector member adapted to be rotated in accordance with the rotation of an engine throttle valve and having a guide portion including a section offset radially relative to the direction of rotation of said rotary detector member, a movable contact movable by the rotation of said rotary detector member and a stationary contact disposed in opposed relationship to said movable contact, said stationary and movable contacts having opened and closed positions which are changed over at two different predetermined rotational positions of said rotary detector member;

means for producing a signal related to the operation of the engine;

means for comparing a temperature representative of the engine operating condition with a predetermined reference level;

judgement means operative, when said engine operating condition temperature is judged by said comparing means as being higher than said predetermined reference level, to judge the position of said throttle valve based on one of the positions of said movable and stationary contacts and on said signal; and setting means operative, when said engine operating condition temperature is judged by said comparating means as being lower than said predetermined reference level, to set, irrespective of said signal, that the position of said throttle valve judged based said one of the positions of said movable and stationary contacts is in fully closed position.

2. An engine throttle valve position detecting system as claimed in claim 1, further including:

means for prohibiting interruption of fuel supply to the engine when said engine operating condition temperature is judged by said comparing means as being lower than said predetermined reference level.

3. An engine throttle valve position detecting system as claimed in claim 1, wherein said engine operating condition temperature is the temperature of engine oil.

4. An engine throttle valve position detecting system according to claim 1, wherein said signal represents the quantity of air sucked into the engine per engine revolution.

5. An engine throttle valve position detecting system according to claim 1, wherein said judgement means are arranged to judge as to whether said throttle valve is closed or opened.

6. An engine throttle valve position detecting system acording to claim 1, wherein said judgement means are aranged to judge the throttle valve position after the lapse of a predetermined time period from the moment when one of the positions of said movable and stationary contacts is changed over to the other.

7. An engine throttle valve position detecting system according to claim 1, wherein said guide portion is formed by a generally arcuate groove formed in said rotary detector member, said movable contact being partially received in said arcuate groove and mounted on an end of a resilient member secured at the other end to a stationary member of the engine.

8. An engine throttle valve position detecting system according to claim 1, wherein said signal represents the pressure in the intake manifold of the engine.

* * * * *